3,726,806
SEMISOLID COMPOSITION USEFUL IN THIN LAYER CHROMATOGRAPHY METHOD
Paul M. Tocci, Miami, Fla., assignor to
TLC Corporation, Miami, Fla.
No Drawing. Continuation-in-part of application Ser. No. 855,477, Sept. 5, 1969. This application Mar. 18, 1971, Ser. No. 125,865
Int. Cl. B01f *1/00;* B01j *13/00*
U.S. Cl. 252—317
9 Claims

ABSTRACT OF THE DISCLOSURE

A semisolid chromatographic solvent composition which is useful especially for use with the disposable chromatographic unit of copending application Ser. No. 855,477, now U.S. Pat. 3,600,306, comprises from about 1% to 15% by weight of a gelling agent such as fumed silica, fumed titania, alumina or starch and a solvent mixture (for example, n-butanol, glacial acetic acid and water) suitable for thin layer chromatography. Heat developable stains and other additives such as stabilizers may also be included.

---

This application is a continuation-in-part of my copending application Ser. No. 855,477, filed Sept. 5, 1969, now U.S. Pat. 3,600,306, for Thin Layer Chromatography Method.

This application relates to a semisolid chromatographic solvent composition. More particularly, this application relates to a composition wherein the chromatographic solvents are in gel or semisolid form such that they can be premixed and stored for many months, thus being available for use at any time. The semisolid solvent compositions are sometimes mixed with a stain and/or a stabilizing agent.

Thin layer chromatography separates a chemical mixture as it is made to move by means of an appropriate migrating solvent through a thin layer of sorbent material which has been applied to a suitable support. The separating mechanism may be one of adsorption, partition or reversed phase partition. Actually a combination of several mechanisms are usually involved. The analyst causes the mechanism of his choice to predominate by the proper selection of sorbent, solvent and developing conditions.

Lipophilic organic compounds of low or medium polarity are most commonly separated by adsorption by thin-layer chromatography. Water-soluble, inorganic compounds and quite polar organic compounds are separated by partition thin layer chromatography.

The composition in gel form can be stored in containers which are relatively air-tight and light-tight and they can be stored in a refrigerator or freezer without degradation for extended time periods. The containers can be small and many can be stored in a very small area. Large batches of mixtures can be made at one time and stored. With uniform solvents available, chromatograms done at different times and in different places will be more comparable than is now possible.

The formulation of various combinations of organic liquids into semisolid form for use in chromatography confers a stability upon the mixture that it does not have when allowed to remain in the liquid state. Volatile compounds are made less volatile since they are adsorbed on the gelling agent. Mixtures of solvents such as n-butyl alcohol and acetic acid tend to have less tendency to form esters (in this case n-butyl acetate) when kept together in gel form for relatively long periods in the presence of acid. After gelling, the ester formation is slowed considerably due to the lack of convection currents, such as are found even in bottles of the compounds left stationary, and especially when such bottles are moved or transported. This lack of solvent movement does not allow micro amounts of impurities which act as catalysts to promote ester formation.

The ability of a gel to be packaged in relatively light-proof and air-proof tubes also slows the formation of free radicals and oxidation products so often encountered when various organic polar and non-polar compounds are kept in translucent and non-collapsible containers such as glass or plastic bottles or cans.

For laboratories that might use chromatography only infrequently this new invention may be the only practical way it can be done. For those that use chromatography more frequently, it should prove to be much less expensive and less troublesome than it is now.

In a preferred embodiment of my invention, the solvent is suspended in particles of fumed silica or fumed titania. When the proportions of fumed silica and solvent are correct the solvent is then put into dispensers which may be of the syringe type, the collapsible tube type or envelope type. As a general indication of the approximate thickness, an amount of the mixed solvent is mixed with an amount of the thickening agent, such as fumed silica or fumed titania such that the beaker or other vessel in which mixing takes place can be turned upside down without the semisolid product spilling out quickly. The proportions of the ingredients will vary widely with the type of solvent mixtures employed. Generally, the amount of thickening agent varies from about 1% to about 15% by weight of the solvent mixture used. Acid and alkaline emulsifiers, solidifiers, thixotropic agents, gelling agents and dispersing agents may be used also to form the semisolid or gel or to improve the characteristics of a particular solvent mixture.

Stabilizers may be added to retard spoilage due to free radical formation, ester production, peroxide formation, fungal or bacterial growth, as well as for oxidation and reduction reaction. Usually only trace amounts (less than 1%) are necessary. Stabilizers included thymol, dimethyl sulfoxide, detergents, ionic resins, anionic resins, anti-bacterials, antifungicides and antibiotics.

In this way light and oxygen-sensitive, volatile chemicals which are used as solvents may be stored for many months so as to be ready for instantaneous use. As is well known to those skilled in the art, prior to this invention it was customary to mix solvents just before use, or at most a day or two before use, since the components often evaporate at different rates and react with each other. Thus, the composition of the solvent changed quickly with time, and soon became of little value.

According to the usual practice after the chromatogram is developed, the chromatogram is stained with some suitable staining reagent which will make the desired compound visible. In my invention those staining reagents which do not react appreciably with the compounds in question until heat is applied and do not react with reagents in the solvent may be incorporated into the semisolid solvent before packaging. In this way the additional step of staining is eliminated. After development, the chromatogram is simply heated and the desired compounds are made visible. The semisolid solvent with stain incorporated therein makes the technique available to many people in an economical and convenient form and avoids the additional stain application step for some separations.

Examples of stains which may be included in the above solvent compositions are:

| Compounds made visible after heating the developed chromatogram | Reagent |
| --- | --- |
| Alcohols, ethers, aldehydes, ketones and related compounds. | 2,2-diphenyl-1-picrylhydrazyl. |
| Polyene aldehydes | Rhodamine. |
| Alkaloids | Chloramine-T. |
| Choline and derivatives | Dipicrylamine. |
| Carbohydrates | Diphenylamine. p-Anisidine-HCl. Aniline phthalate. m-Phenylenediamine.2HCl. |
| Chlorinated pesticides | o-Toluidine. Diphenylamine-ZnCl₂. |
| Amino acids | Ninhydrin. Isatin. |
| Flavanoids | Aluminum chloride. |
| Inorganic ions | Alizarin. Quercetin. |
| Organotin compounds | Pyrocatecholsulfonaphtalene. |
| Sb and Bi ions | Sodium dithionite. |
| Alkali and alkaline earths | Violuric acid. |
| Lipids, phospholipids and related compounds. | Crystal violet. Bromothymol blue. Morin. |
| Organic acids | D-glucosylaniline. |
| Steriods | p-Phenylenediaminophthalic acid. |
| Vitamin B₆ | N,2,6-trichloro-p-benzoquinoneimine. 2,6-dichloroquinone-chlorimidimine. |

The liquid solvents which are useful in my invention to form semisolid gels with materials such as fumed silica, fumed titania, alumina or starch include alcohols, esters, ethers, ketones, hydrocarbons, halogenated hydrocarbons, organic bases, organic acids, inorganic bases, inorganic acids and the like. More particularly, the following compounds have been found suitable:

| | |
| --- | --- |
| Methanol | Benzene |
| Ethanol | Toluene |
| Propanol | Xylenes |
| Butanols | Naphthalene |
| Ethyl acetate | Hexane |
| Ethylene glycol | Heptane |
| Glycerol | Carbon tetrachloride |
| Acetone | Petroleum ether |
| Methyl ethyl ketone | Pyridine |
| Acetic acid | Lutidine |
| Glycol ethers | Buffers |

The following examples illustrate specific applications of solvent mixtures useful in my invention:

(1) For amino acids and amines

Reagent (a): Percent by wt.
n-Butanol _____ 61
Glacial acetic acid _____ 15
Water _____ 15
Fumed silica _____ 9

To include stain in the solvent, add 0.2% by weight Ninhydrin. To increase sensitivity, add 0.008% isatin by weight and 0.8% lutidine by weight to the Ninhydrin gel.

Reagent (b): Percent by wt.
Benzene _____ 60
Glacial acetic acid _____ 33
Water _____ 1
Fumed silica _____ 6

(2) For mono- and disaccharides

Reagent (a): Percent by wt.
Ethyl acetate _____ 54
Pyridine _____ 22
Water _____ 18
Fumed silica _____ 5.6

To include the stain, add 2% by weight aniline and 1.7% by weight phthalic acid.

Reagent (b): Percent by wt.
Isopropanol _____ 77
Water _____ 19
Fumed silica _____ 4

Use same proportions for stain inclusion.

(3) For lipids, fatty acids and cholesterol esters

Reagent (a): Percent by wt.
Hexane _____ 45.0
Ether _____ 45.0
Glacial acetic acid _____ 0.9
Fumed titania _____ 9.1

Reagent (b):
Chloroform _____ 67.0
Methanol _____ 26.0
Water _____ 3.5
Fumed titania _____ 3.5

(4) For alkaloids, barbiturates and amphetamines

Reagent: Percent by wt.
Ethyl acetate _____ 81.0
Methanol _____ 9.5
Ammonium hydroxide _____ 4.8
Fumed silica _____ 4.7

Various modifications and variations of the present invention may be made without departing from the spirit of the discovery or the scope of the appended claims.

What is claimed is:

1. The semisolid composition consisting of the following ingredients in parts by weight:

Percent
Fumed silica _____ 9
n-Butanol _____ 61
Glacial acetic acid _____ 15
Water _____ 15

2. The semisolid composition consisting of the following ingredients in parts by weight:

Percent
Fumed silica _____ 6
Benzene _____ 60
Glacial acetic acid _____ 33
Water _____ 1

3. The semisolid composition consisting of the following ingredients in parts by weight:

Percent
Fumed silica _____ 5.6
Ethyl acetate _____ 54
Pyridine _____ 22
Water _____ 18

4. The semisolid composition consisting of the following ingredients in parts by weight:

Percent
Fumed silica _____ 4
Isopropanol _____ 77
Water _____ 19

5. The semisolid composition consisting of the following ingredients in parts by weight:

Percent
Fumed titania _____ 9.1
Hexane _____ 45.0
Ether _____ 45.0
Glacial acetic acid _____ 0.9

6. The semisolid composition consisting of the following ingredients in parts by weight:

Percent
Fumed silica _____ 4.7
Ethyl acetate _____ 81.0
Methanol _____ 9.5
Ammonium hydroxide _____ 4.8

7. The semisolid composition consisting of the following ingredients in parts by weight:

| | Percent |
|---|---|
| Fumed titania | 3.5 |
| Chloroform | 67.0 |
| Methanol | 26.0 |
| Water | 3.5 |

8. The semisolid composition consisting of the following ingredients in parts by weight:

| | Percent |
|---|---|
| Fumed silica | 9.0 |
| n-Butanol | 61.0 |
| Glacial acetic acid | 15.0 |
| Water | 15.0 |
| Ninhydrin | 0.2 |
| Isatin | .008 |
| Lutidine | .08 |

9. The semisolid composition consisting of the following ingredients in parts by weight:

| | Percent |
|---|---|
| Fumed silica | 5.6 |
| Ethyl acetate | 54.0 |
| Pyridine | 22.0 |
| Water | 18.0 |
| Aniline | 2.0 |
| Phthalic acid | 1.7 |

References Cited

UNITED STATES PATENTS

| | | | |
|---|---|---|---|
| 3,354,088 | 11/1967 | Elmquist | 252—90 |
| 3,189,541 | 6/1965 | Brenner et al. | 210—31 |
| 2,902,351 | 9/1959 | Stokes | 252—28 X |
| 3,218,263 | 11/1965 | Boyle et al. | 252—305 |
| 3,468,814 | 9/1969 | Dernier et al. | 252—408 |

RICHARD D. LOVERING, Primary Examiner

U.S. Cl. X.R.

210—31; 252—364, 408